United States Patent

Grouffal et al.

[11] Patent Number: 6,070,129
[45] Date of Patent: May 30, 2000

[54] METHOD AND SYSTEM FOR TRANSMITTING SEISMIC DATA TO A REMOTE COLLECTION STATION

[75] Inventors: Christian Grouffal; Renate Bary, both of Rueil-Malmaison; Gérard Thierry, Nanterre, all of France

[73] Assignee: Institut Francais du Petrole, Cedex, France

[21] Appl. No.: 09/121,532

[22] Filed: Jul. 24, 1998

[30] Foreign Application Priority Data

Jul. 24, 1997 [FR] France ................................. 97 09547

[51] Int. Cl.⁷ .................................................. G01V 1/22
[52] U.S. Cl. ................................................ 702/32; 367/77
[58] Field of Search .............................. 367/76, 77, 21, 367/78, 20, 80, 79; 702/32

[56] References Cited

U.S. PATENT DOCUMENTS

| | | | |
|---|---|---|---|
| 3,062,315 | 11/1962 | Herzog | 181/0.5 |
| 3,555,502 | 1/1971 | Davis, Jr. et al. | 340/15.5 |
| 3,629,831 | 12/1971 | Mijus | 340/152 |
| 4,583,206 | 4/1986 | Rialan et al. | 367/78 |
| 4,712,199 | 12/1987 | Rialan et al. | 367/76 |
| 4,862,167 | 8/1989 | Copeland, III | 341/107 |
| 4,905,205 | 2/1990 | Rialan | 367/77 |
| 4,979,152 | 12/1990 | Rialan et al. | 367/77 |
| 5,550,787 | 8/1996 | Rialan et al. | 367/77 |

FOREIGN PATENT DOCUMENTS

| | | |
|---|---|---|
| 0277067 | 8/1988 | European Pat. Off. . |
| 2608780 | 6/1988 | France . |
| 19519164 | 12/1995 | Germany . |
| 9713164 | 4/1997 | WIPO . |

OTHER PUBLICATIONS

D. George "Data Compression Breakthrough Makes Real-Time Seismic Evaluation a Reality", Offshore, vol. 56, No. 3, Mar. 1, 1996, p. 33 (XP000596440).

*Primary Examiner*—Christine K. Oda
*Assistant Examiner*—Anthony Jolly
*Attorney, Agent, or Firm*—Antonelli, Terry, Stout & Kraus, LLP

[57] ABSTRACT

The invention pertains to transmission to a remote station, by means of transmission channels (generally radio transmission channels), of seismic data acquired by a data collection equipment comprising a plurality of acquisition units, each being suited to acquire, to store and preferably to compress the data to be transmitted. The invention comprises ordered storage, in a high-capacity memory (flash type memory for example) of each acquisition unit (Ai), of data obtained during successive emission-reception cycles (acquired and possibly preprocessed seismic data) so as to form a stream of stored data to be transmitted, and progressive transfer of the stored data stream from each acquisition unit to the remote station by means of the transmission channel, by reading each storage memory, with a time lag in relation to the time of their storage depending on the transmission rate of each transmission channel and on the transmission mode selected with preferably, if sending of the data of a cycle is delayed, sending of at least partial data, compressed or not, for quality control purposes. The data transmitted are reconstituted at the remote station. The method can be used for large-scale seismic data transmission.

23 Claims, 2 Drawing Sheets

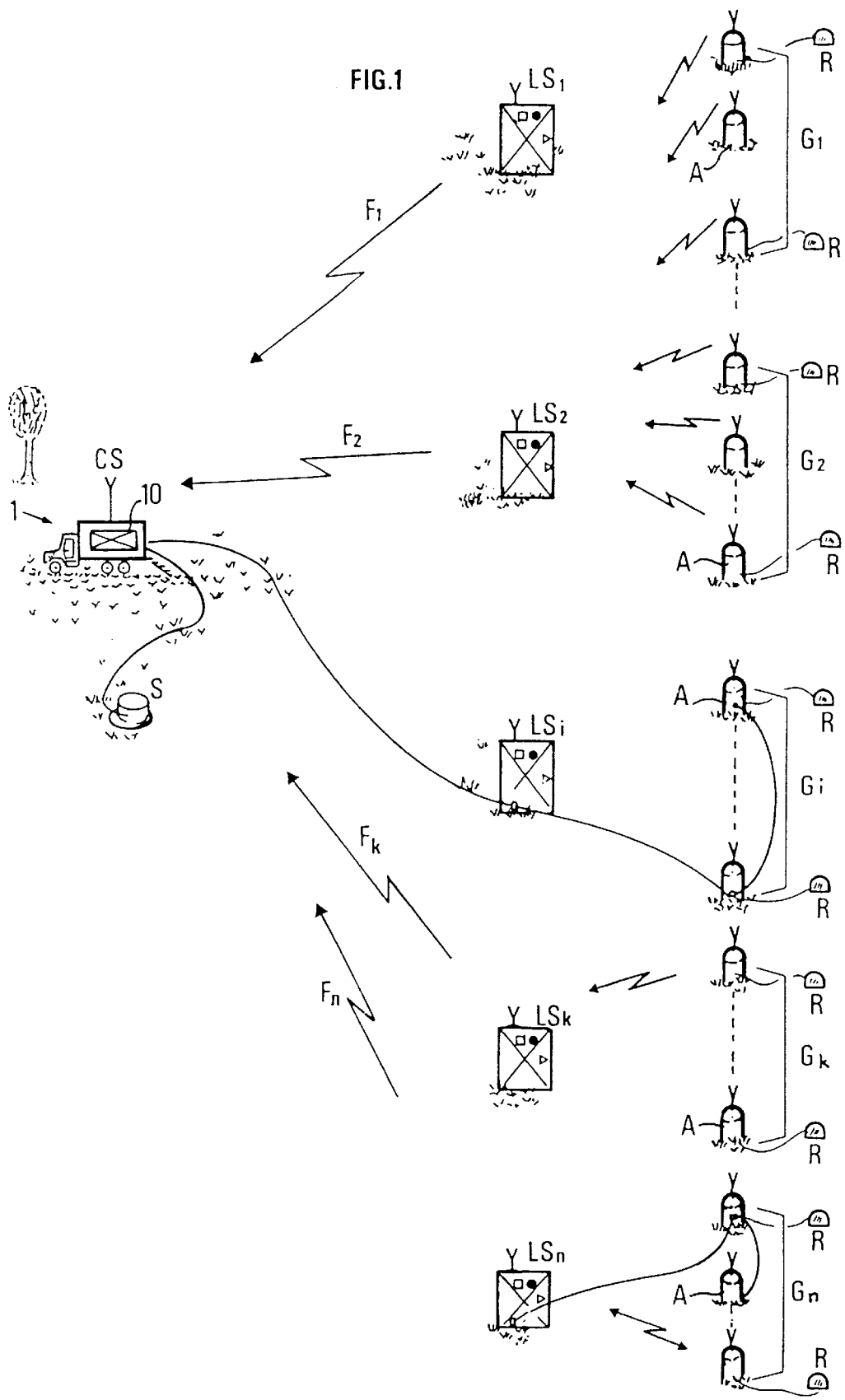

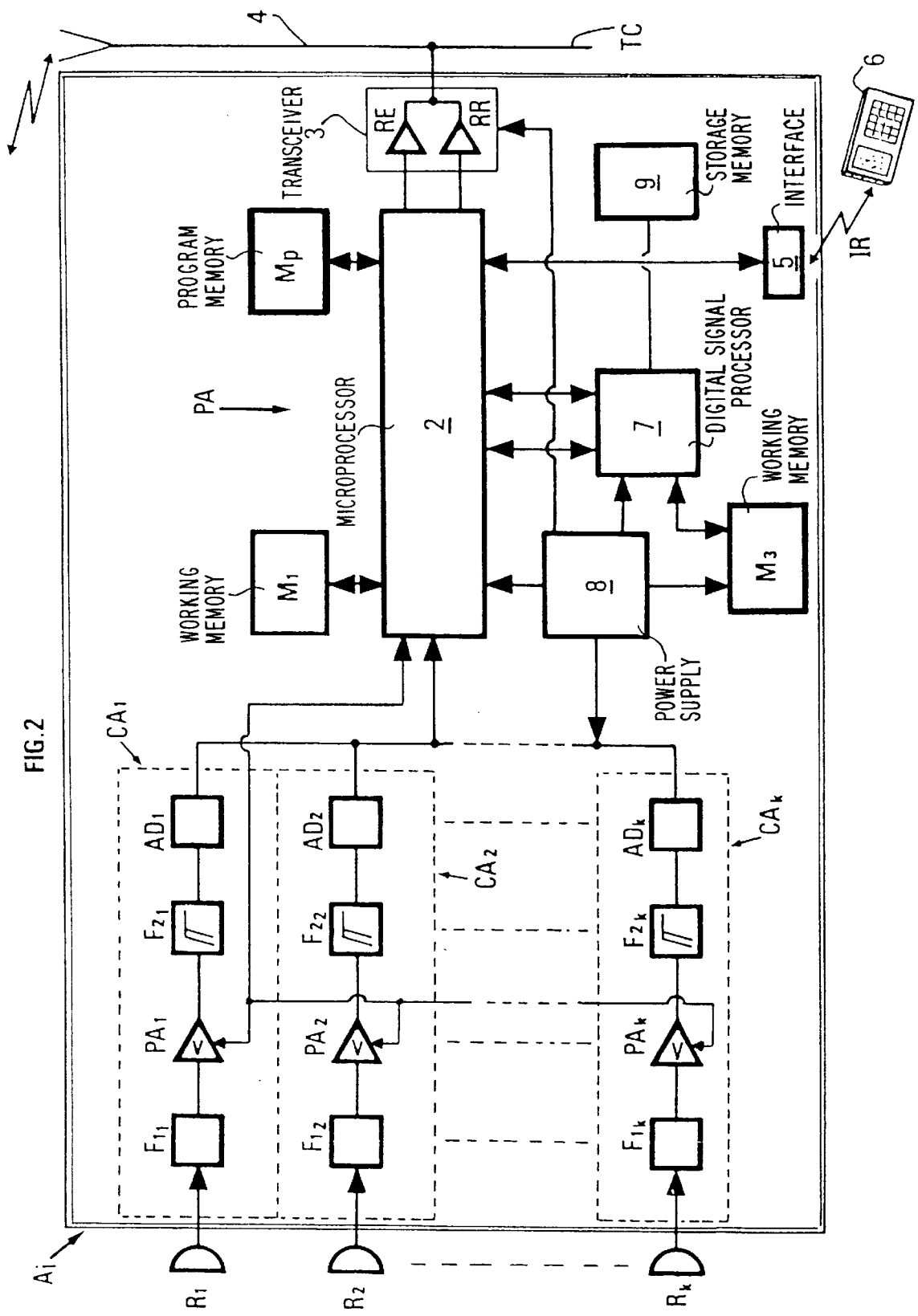

METHOD AND SYSTEM FOR TRANSMITTING SEISMIC DATA TO A REMOTE COLLECTION STATION

BACKGROUND OF THE INVENTION

1. Field of the Invention

The present invention relates to a method and to a system for transmitting (notably by radio waves) data to a remote station, allowing reacquiring of data acquired by a data collection equipment comprising large number of local collection stations. The method preferably uses compression techniques in order to optimize the use of available transmission channels.

2. Description of the Prior Art

Various seismic data transmission systems are used to connect local acquisition units to a central station, either directly or via intermediate stations provided complex local units concentration or control functions. The links can be provided by cables, radio links, possibly via one or more relays, or the cable links and the radio links can be combined as mentioned for example in French Patent 2,720,518, European Patents 0,594,477 and 0,275,781, and U.S. Pat. Nos. 4,815,044, 4,979,152, 4,583,206 or 4,908,206 filed by the assignee.

The assignee's European Patent 0,275,781 notably mentions the use of seismic acquisition units fitted with two transmission channels, one with a relatively high transmission rate, the other with a bandwidth that can be relatively narrow according to the local availability of the transmission frequencies, more readily available within the framework of the radioelectric emission regulations in force. The seismic data collected during the successive cycles are stored on a mass storage in each of the units and intermittently transferred to a central control and recording station. In order to allow the operator in the central station to check that data acquisition by each acquisition unit is progressing normally, a partial data transmission is performed, which turns out well with a transmission channel with a relatively narrow bandwidth.

French Patent 2,692,384 and corresponding U.S. Pat. No. 5,550,787, also filed by the assignee, mentions using seismic acquisition units notably provided with a processed having specialized signal processing which performs many geophone and acquisition chain element controls and seismic trace preprocessings which were previously performed at the central station after transmission, thus allowing a considerable decrease in the volume of data to be required.

The current trend, notably within the scope of 3D seismic exploration methods, spreads out, in a zone to be explored, onshore, offshore or in coastal areas, often over several square kilometers, hundreds or even thousands of seismic receivers. The volume of the data to be collected and transmitted increases constantly. In order to prevent transmission problems from braking the evolution of seismic systems, the trend consists in using data compression processes compatible with the geophysicists' specific requirements.

If for example the problem of real-time repatriation to a central station of 1000 seismic "traces", each sampled every 2 ms during a recording cycle n is considered, it is necessary to transmit, during the progress of the next cycle n+1, a cross global transmission rate of 14.4 Mbit/s (if the error correction and detection bits are taken into account) to be distributed among 36 radio channels. If a TFM type modulation system allowing a 400 Kbit/s transmission rate in a 500 kHz bandwidth is used therefore, a global bandwidth of 18 MHz is necessary. This condition is very difficult or even impossible to satisfy in practice for many reasons. Sufficient transmission licenses first have to be obtained from the local bodies controlling frequency allocation to users. The radio environment and the weather conditions are likely to disturb transmissions and thunderstorms, static discharges, etc, also have to be taken into account. The configuration of the sites crossed and local link difficulties can also constitute an additional problem. For all these reasons, the bandwidth that is actually available is often much narrower than that required for real-time data transmission.

In addition to the specifically radio constraints, the fact that the seismic acquisition velocity is also imposed by the exploration conditions also has to be taken into account. In intermediate zones running along shores, the seismic sources are for example air guns towed underwater by one or more boats progressing at constant speed which impose a particular "shooting" rate and periodical seismic session interruptions during the time requited for U-turns and for realignment along a new profile.

In order to prevent transmission problems from braking the evolution of seismic systems, the trend consists in using data compression processes compatible with the geoplysicists' specific requirements.

French Patent 2,757,641 filed by the assignee relates to a two-stage compressed seismic data transmission method intended for transmission, to a central station, of the seismic signals received by seismic receivers and acquired by collection units placed in the field, which is well-suited for turning the irregular distribution of the seismic data collection peaks to best account, in the usual practice of seismic exploration operations. This method allows performing control transmissions intended to check the smooth running of acquisition operations by means of each of the acquisition units in the field as well as complete transmissions of seismic data to a central control station, so as to recover without loss all the seismic traces transmitted while limiting as much as possible the transmission times required therefore.

A invention comprises two-stage transmission of the seismic data having, during a first stage, compressed data transmission allowing control of the quality of operation of the local units and, during a second stage, (compressed or not) data transmission and recording without seismic data losses at the remote station.

The previous method comprises for example local recording of the data, data compression with a selected compression rate, followed by a first state of transmission of these compressed data, determination of the difference between the data recorded locally and the corresponding compressed data, a later stage of transferring this difference and reconstitution, at the central station, of the seismic data collected by each local collection unit by combining the data received during the two transmission and transfer stages.

During the first stage, a compression whose rate is suited to the duration of a transmission window placed during time intervals between successive seismic emission-reception cycles and to the transmission rate of the channel used is applied to each seismic trace. At least part of each seismic trace is thus transmitted, which allows an operator at the central station to check that recording goes off correctly in each collection unit. During the second stage, at the end of the seismic session in progress for example, the seismic traces are reconstituted in the central station with all the precision required.

SUMMARY OF THE INVENTION

The method according to the invention transmits to a remote station, by means of transmission channels, seismic data obtained during successive emission-reception cycles of a seismic session, comprising emission of elastic waves in an underground formation, reception by receivers of the waves reflected by the underground formation in response to the waves emitted and acquisition thereof by a data collection equipment including a plurality of acquisition units suited to acquire seismic data, to store them in storage means and to transmit them to a remote station, allowing lessening of damp the data transmission rate variations during the successive emission-reception cycles (for example because the time required for transmission of the data collected during at least part of the emission-reception cycles of the session by the available transmission channels is longer than the duration ol the transmission windows allocated to the acquisition units).

The method according to the invention finds applications notably in the field of seismic exploration where transfer of a considerable quantity of data to a central station such as a recording truck is required. Signals are picked up by a large number of receivers such as geophones coupled with a geologic formation to be studied, in response to impact pulses emitted by a seismic source and reflected by the subsoil discontinuities. The signals picked up are collected by local acquisition units sometimes spread out over a distance of several kilometers or surfaces of several square kilometers, each intended to collect the signals received by one or more receivers, to digitize them, to apply complex preprocessings thereto and to store them in a local memory before real-time or deferred transmission thereof to a collection station by means of a transmission channel such as a cable, an optical fiber, a radio channel, etc.

The invention comprises:
- ordered accumulation, in a storage memory of each acquisition unit, of data obtained during the successive emission-reception cycles, so as to form a stream of data to be transmitted,
- progressive transfer of the stored data stream by a transmission channel from each acquisition unit to the remote station, by reading the storage memory, with a distribution of the data accumulated among a series of successive transmission windows so as to compensate for possible transmission delays at the is end of this series of windows.

When the time required for data transmission on the available transmission channels during a certain number k of emission-reception cycles of session by the transmission channel used is for example longer than the transmission time allocated to each acquisition unit during these k emission-reception cycles, the data are so distributed that this transmission time is at most equal on average to the duration of the transmission window allocated to each acquisition unit for a certain number N (N>k) of successive emission-reception cycles of the session.

According to an embodiment, the method comprises progressive transfer of the data stream from each acquisition unit to the remote station with a time lag in relation to the time or storage which can be equal to at least a determined fraction of an emission-reception cycle or to a whole number of emission-reception cycles, as well as, during acquisition of the data of each emission-reception cycle, transmission of data representative of quality controls.

According to an embodiment, data transfer is performed with a different effective time lag for distinct fractions of the seismic data acquired during a single emission-reception cycle.

The transmission method can comprise for example applying to at least part of the data accumulated in acquisition units a compression without loss and a decompression of at least part of the data accumulated in acquisition units prior to transmitting them to the remote station.

According to a preferred embodiment, part of the data transmitted during each transmission window allocated is representative of quality control results and can be formed for example by compression with or without acquired seismic data loss.

The data transmitted can be decompressed at the remote station.

The transmission system of the present invention comprises a processing unit which provides controlled ordered accumulation, in a storage memory, of data acquired during the successive emission-reception cycles, so as to form a stream of data to be transmitted, and which controls progressive transfer of the stream of data accumulated from each storage memory to the remote station by the transmission channel, try reading the storage memory, with unequal distribution of the data accumulated among a series of transmission windows successively allocated to each acquisition unit (inequality imposed by various factors: data rate of the transmission channel, duration of the transmission windows, compression rate actually applied to the data, etc) and the device placed in the remote station and intended for reconstitution of the various data collected and transmitted.

The processing unit preferably compresses the data prior to the storage thereof in the acquisition units and optionally decompresses the data prior to the transmission thereof to the remote station, the latter decompressing the received data.

The processing unit in each acquisition unit preferably comprises a signal processor programmed to apply to the seismic data a compression algorithm with or without loss or possibly at least two different compression algorithms with transfer, into the corresponding storage memory, of the compressed seismic data with the algorithm producing the higher compression rate.

According to an embodiment, the storage memory comprises a FIFO type memory for ordered storage of the seismic data, the processing unit provides ordered reading of each storage memory with a rate depending on the transmission channels available, and the remote station reconstitutes all the seismic data transmitted.

The system is particularly well-suited for the use of radio as the transmission mechanism.

The processing unit of each acquisition unit is preferably suited to apply preprocessings to thc seismic data.

The high capacity ol the storage memories allows accumulation of a considerable quantity of data and allows a large time lag between the time of accumulation of the data and the time when they are actually transmitted. The transmission method thus allows flexable lessening of the irregularities due to multiple causes that can occur during the progress of the seismic sessions and which lead to great variations in the mean transmission rate of the seismic information acquired in the field.

BRIEF DESCRIPTION OF THE DRAWINGS

Other features and advantages of the method and of the system according to the invention will be clear from reading the description hereafter of a non limitative embodiment example applied to the transmission of seismic data, with reference to the accompanying drawings wherein:

FIG. 1 diagrammatically shows a seismic data acquisition and transmission device, and FIG. 2 diagrammatically shows the organization of a local acquisition unit.

DETAILED DESCRIPTION OF THE PREFERRED EMBODIMENTS OF THE INVENTION

The seismic device diagrammatically shown in FIG. 1 comprises considerable number (several hundreds to several thousands) of seismic receivers R spread out at intervals in a zone to be explored, according to a layout suited to the 2D or 3D prospection type to be performed, these receivers picking up the seismic waves reflected by underground discontinuities in response to the transmission in the ground of seismic waves produced by a source S, and a remote station such as a central control and recording station 1 where all the seismic signals collected are eventually centralized by means of the transmission system described hereafter. Each one of receivers R is most often made up of a string of aligned elementary pickups which produce each a "seismic trace".

The device comprises a set of acquisition units or local seismic data collection units A, each suited for acquisition of n seismic traces (n ranging from 1 to 6 for example).

The set of acquisition units A communicates with a central station CS either directly (by radio or cable), or optionally by means of intermediate stations LS with complex functions. The intermediate stations LS may be concentrators intended to organize and to sequence exchanges between acquisition units (or units) A and central station CS, as described for example in European Patent A-594,477 filed by the assignee. In addition to these concentration functions, each intermediate station LS can be provided with functions relative to control of various tasks executed by local units A, under the control of the central station as described in French Patent A-2,720,518. Each one of these intermediate stations LS controls for example a number p of local acquisition units A. They most often communicate with the units of their respective groups by means of a radio link. The intermediate units generally communicate with central station CS by radio channels F1, F2, . . . , Fn.

Source S can be an impulsive source (an explosive charge for example or an air gun) or a vibrator. This source can be coupled with the formations of the zone to be explored and connected by control radio or cable to central station CS or, in case of coastal area exploration, possibly towed underwater by a shooting boat linked to the central station by radio.

Each acquisition unit Ai (FIG. 2) is suited for acquisition of a number k (k=6 for example) of seismic receivers $R_1, R_2, R_k$, each providing a seismic "trace". To that effect, it comprises for example k acquisition chains $CA_1$ to $CA_k$ receiving respectively the k signals and comprising each for example a low-pass filter $F_{11}, F_{12}, \ldots, F_k$, a preamplifier $PA_1, PA_2, \ldots, PA_k$, a high-pass filter $F_{21}, F_{22}, \ldots, F2_k$ and an analog-to-digital converter (ADC) $AD_1, AD_2, \ldots, AD_k$ for converting the amplified and filtered analog signals into digital words. All the acquisition chains are connected to a microprocessor 2 processing the 16 to 32-bit digital words for example, programmed to control acquisition and exchanges with the remote station (not shown). A working memory $M_1$ and a memory $M_p$ for the programs are associated with microprocessor 2. Processor 2 is connected to an emission-reception unit 3 suited to the transmission channel used for communication with the remote station. If it is a radio channel, unit 3 comprises a radio transmitter RE and a radio receiver RR which communicates with an antenna 4.

An interface unit 5 described in the aforementioned French Patent A-2,608,780 furthermore allows communication by infrared radiation with an initialization unit 6 by means of which an operator can optionally send control processor 2 addressing and selection instructions relative to operating parameters of the acquisition chains.

Each acquisition unit Ai also preferably comprises a processor 7 specialized in signal processing, such as a DSP 96002 type floating point 32-bit processor for example, which is associated with a DMA type device intended to accelerate transfers by data blocks between the two processors 2 and 7. A working memory M3 is associated with processor 7. Each acquisition unit also comprises a self-contained power supply 8.

The functions of general processor 2 provide decoding the instructions transmitted by the remote station and in controlling:

acquisition of the signals of receivers $R_1$ to $R_k$ by the various acquisition chains,
transmissions in connection with transmission unit 3,
memory $M_1$ intended for temporary storage of data,
inputs/outputs,
interruptions between programs,
exchanges with DSP computing processor 7, etc.

DSP computing processor (7) is particularly well-suited for carrying out at high speed operations such as format conversions, multiplication of complex numbers, FFT type Fourier transforms, correlations between the signals received and those transmitted, digital filtering, stacking of successive shots with elimination of disturbance noises of non seismic nature, combination of the signals delivered by multi-axis seismic receivers such as triaxial geophones for example, etc. Preprocessings performed locally prior to transmission contribute to reducing appreciably the number of tasks assigned to the remote station and therefore the installed computing power, which becomes considerable when the number of seismic traces to be acquired in real time reaches several hundreds or even exceeds a thousand.

Each acquisition unit also comprises a high-capacity storage memory 9 capable of storing the volume of data transmitted in deferred mode to the remote station according to the various methods of operation that are described hereafter. A memory referred to as "flash" memory is for example used. This memory can be for example a FIFO type memory or it can work like a FIFO type memory of sufficient capacity to contain the seismic data of several hundred seismic emission-reception cycles or "shots" (500 shots for example).

Generally speaking, the method according to the invention is based on an accumulation of data in storage memory 9 intended for storage of data obtained during successive emission-reception cycles so as to obtain a stream of data to be transmitted, and on a deferred ordered transfer of the content thereof to the remote station by means of the available transmission channel. These data correspond to the seismic data acquired and possibly preprocessed by processor 7 as mentioned above and possibly (preferably) previously compressed.

The effective rate of readout of storage memory 9 and of transfer to the remote station depends on several factors.

It first depends on the rate of transmission of the channels used, which can vary from case to case according to the availability of the radio channels that have been granted by the local body in charge of radio emissions control for the exploration survey, and also according to local transmission conditions.

It also depends on the rate of compression that has actually been applied to the data and which modifies the "length" of the compressed seismic traces, the word length being used here to refer to the FIFO memory space necessary for the storage thereof.

It also depends on the mean rate of the seismic information acquired linked with the sampling frequency of the seismic signals received. For a given sampling interval, the mean information rate of course depends on the interval between the emission-reception cycles of a seismic session, which can be regular with an interval between cycles of some seconds (2 s for example), or irregular because of technical interruptions of the seismic acquisition sessions. In fact, interruptions are necessary for example in order to shift the source (onshore applications) or for example to allow a boat towing the offshore source and cruising on the open sea to do a U-turn and to realign so as to perform the next pass along the seismic profile for offshore seismic applications.

The "length" of the compressed information is very variable. For traces close to the source where the signal-to-noise ratio S/B is high, a very high compression rate (of the order of 70 to 80%) and therefore a short "length" can be obtained. For traces far away from the source for which ratio S/B is smaller, the compression rate that is actually applied can be low or even zero. It may even happen that the compressed trace is "longer" than the original if ratio S/B is too low.

In practical instances where the seismic data are preferably compressed, the signal processor (DSP) in each acquisition unit Ai is advantageously programmed to optimize compression. It can for example apply simultaneously at least two different compression algorithms with different criteria which involve for example the energy of the seismic signal, the type of seismic source used, either a vibrator, an air gun or an explosive charge, etc. A comparison is made after these parallel compressions without loss between the compressed data (the seismic traces in this case) and the initial data, and the "shortest" (having the best compression rate) result is kept. The signal processor can also be programmed to select, according to certain operational criteria, the compression algorithm that offers the best compression rate without any loss possibility.

Globally, when taking account of all the factors that can influence the effective compression rate applied to the various traces oft a set ot traces, a mean rate of 40 to 50% is obtained in practice.

The storage memory used with the high capacity thereof allows taking into account, with great flexibility, of irregularities in the course of the seismic sessions, which leads to considerable variations in the mean rate of acquired seismic information whatever the effective rate of the transmission channels used. The delay between the acquisition of a trace and the effective transfer thereof to the central station can thus vary within large proportions and reach, if the memory capacity permits, several ⅙ hour intervals (duration of several hundred seismic acquisition cycles or "shots"), a delay that is acceptable by geophysicists especially if partial transmissions are provided between successive shots in order to check that acquisition is proceeding normally, as provided for in the method described in European Patents 0,275,781 and corresponding U.S. Pat. No. 4,905,205.

Various methods of organizing acquisition and transfer sequencing will now be described.

The transmission system first lends itself to two different operation sequencings which do not require storage memory 9, but only working memories M1 and M3:

1) the mode where shot N is acquired and the corresponding data are transferred thereafter, and
2) the mode where shot N is acquired while shot N−1 is transferred.

The following modes comprise using storage memory 9 for deferred transfers.

3) The data of a certain number of shots N, N+1, N+2, etc, are successively acquired with storage, each time, of the corresponding data, with progressive filling of storage memory 9. According to this mode, the processing unit performs no quality control. The following three modes comprise such a control.

4) According to a variant of the previous mode, during acquisition of one of the shots of the series, partial data of the previous shot, sufficient for operators at the remote station to be able to perform a quality control (QC) and in short check that the acquisition unit works properly, are transmitted. Such partial transmissions intended for control have already been described in the aforementioned French Patent Application 96/15,823.

5) The data of a series of successive shots N, N+1, N+2, etc, are acquired and stored in storage memory 9 and, during acquisition of the data of several of the next shots N+1, N+2, etc, successive fractions of the data of shot N are read and transmitted. This method of operation is suitable in cases where the rate of the transmission channel used and/or the data volume of each shot requires a longer transmission time.

6) The data of shot N are acquired and, at the same time, a determined fraction X of the data of shot N−p is read and transmitted, and the data of this shot N are stored in storage memory 9. This mode allows spreading of transmission of the data of one shot over several (i) later emission-reception cycles without delaying the rate of succession of these cycles. The data are thus shared out into i groups of traces transmitted successively.

If N=5 for example and the total number or traces is 200, this number is split up into 4 groups of traces with 50 traces each, which requires 4 successive cycles for reading and transmission of these 4 groups. During acquisition of the successive shots No. 5, No. 6. No. 7, No. 8, the traces 1 to 50, 51 to 100, 101 to 150 and 151 to 200 of shot No. 4 are reread and transmitted successively.

7) This mode corresponds to the acquisition of a shot N and simultaneously to the rereading and transmission of the data of a previous shot N−x, followed by storage of shot N in storage memory 9. It is a mode where memory 9 works like a FIFO memory without slowing down the rate of succession the shots as it may be the case with modes 1 and 2 above. The time lag between storage of the data of a shot and the effective transmission thereof by rereading of memory 9 of course depends on the transmission conditions, i.e. the number of frequencies available and the respective transmission rates thereof.

8) This mode corresponds to the rereading and transmission or the data of shots that have been previously stored.

9) This mode corresponds to the case where the volume of acquired seismic data to be transmitted is not compatible with the transmission mechanism that may be available for connecting each acquisition unit with the central station. This occurs when the number of transmission frequencies that may be available and/or the transmission rate thereof is insufficient. It is also the case when the seismic source is for example an air gun capable of "shooting" at close intervals (every 15 s for example), so that the transmission windows are very "narrow", in any case too narrow to allow complete repatriation within a reasonable time. In this case, the transfer process described in U.S. Pat. No. 4,905,205 filed by the assignee is used by concentrating the transmission of at least part or all of the data accumulated in a single transmission window during which a mass storage displaced in the field and connected thereto by a short-range link: a cable or an infrared optical link for example, is connected to each acquisition unit. With such an implementation, the flexibility provided by the storage memory where the continuously accumulated data are all individually identified and listed is turned into the best account. The storage memory 9 of each unit can be dumped any time under such conditions, even during an acquisition stage and in any order.

All the previous modes work, whether the seismic data are compressed or not prior to storage in storage memory 9 and whether they are transmitted in compressed form or decompressed for rereading.

Compression algorithms without loss are preferably applied to the seismic data, as described in the aforementioned French Patent Application 2,757,641 filed by the applicant. The partial data transmitted for functions performed in certain previous modes can be either partial data obtained by compression without loss, or data that have been compressed with loss but which remain sufficiently representative for appreciation of the working quality of the acquisition units despite the compression rate applied.

The data transmitted to the remote station CS are preferably decompressed by a processor 10 (FIG. 1) prior to being recorded in a mass storage. The case where the data stored in each acquisition unit in compressed form are decompressed by processor 7 (FIG. 2) prior to being transmitted to remote station CS is however not excluded.

What is claimed is:

1. A method of transmission of seismic data to a remote station obtained during successive emission-reception cycles of seismic sessions in which during each emission reception cycle an emission of elastic waves is produced which are reflected by an underground formation in response to the emission of elastic waves and are received with a plurality of receivers, seismic data representing the received reflected waves is acquired with data collection equipment including a plurality of data acquisition units each including a storage memory for storing the seismic data with the stored seismic data being transmitted by transmission channels to the remote station during time windows distributed over the successive emission-reception cycles with time required for transmission of the seismic data stored in each data acquisition unit during at least part of each session using available transmission channels which are insufficient to complete transmission of the seismic data stored in each data acquisition unit within a duration of a transmission window allocated to each of the data acquisition units, the method comprising:

accumulating in order in the storage memory of the acquisition units seismic data from the successive emission-reception cycles so as to form the stored seismic data to be transmitted by the transmission channels; and discontinuously transmitting the stored seismic data to the remote unit by reading the accumulated seismic data in the storage memories and distributing the read accumulated seismic data over the successive transmission windows to lessen variation in seismic data flow during the transmission of the stored seismic data to the remote station.

2. A method as claimed in claim 1, wherein:

time required for data transmission on each available transmission channel during a number k of emission-reception cycles of the sessions by the transmission channels used is longer than transmission times allocated to each data acquisition unit during the k emission-reception cycles, the seismic data are distributed so that transmission time is at most equal on average to a duration of the transmission window allocated to each acquisition unit for a number N (N>k) of successive emission-reception cycles of the session.

3. A transmission method as claimed in claim 2, wherein:

the discontinuous transmitting of the stored seismic data to the remote station is with a time lag in relation to a time of storage equal to at least a determined fraction of an emission-reception cycle.

4. A transmission method as claimed in claim 2 wherein the discontinuous transmitting is performed with a time lag equal to a whole number n (n≧1) of cycles and during acquisition of the seismic data of each emission-reception cycle transmission of data representative of quality control occurs.

5. A transmission method as claimed in claim 2, wherein the discontinuous transmitting is performed with a different time lag for distinct fractions of the seismic data acquired during a single emission-reception cycle.

6. A transmission method as claimed in claims 1, wherein at least part of the data accumulated in the data acquisition units is compressed data.

7. A transmission method as claimed in claim 6, wherein decompression of at least part of the seismic data accumulated in the data acquisition units occurs prior to transmission to the remote station.

8. A transmission method as claimed in claim 2, wherein part of the seismic data transmitted during each transmission window is representative of quality control results.

9. A method as claimed in claim 8, wherein the seismic data representative of quality control results are formed by compression without loss of acquired seismic data.

10. A method as claimed in claim 8, wherein the seismic data representative of quality control results are formed by compression with loss of acquired seismic data.

11. A method as claimed in claim 9, wherein decompression of the seismic data occurs at the remote station.

12. A method as claimed in claim 1, further comprising: performing a deferred transfer of a part of data remaining in the storage memories of the data acquisition units to a mass storage which is displaced successively in a vicinity of the data acquisition.

13. A transmission system which transmits seismic data to a remote station obtained during seismic sessions having successive emission-reception cycles in which during each emission-reception cycle an emission of elastic waves is produced which are reflected by an underground formation in response to the emission of elastic waves and are received with a plurality of receivers, seismic data representing the received reflected waves is acquired with data collection equipment including a plurality of data acquisition units each including a storage memory for storing the seismic data with the stored seismic data being transmitted by transmission channels to the remote station during time windows spread over the successive emission-reception cycles with a time required for transmission of the seismic data stored in each data acquisition unit during at least part of each session using available transmission channels which are insufficient to complete transmission of the seismic data stored in each data acquisition unit within a duration of a transmission window allocated to each of the data acquisition units comprising:

a processing unit controlling providing ordered accumulation of the seismic data in the storage memories during successive emission-reception cycles to form the stored seismic data to be transmitted by the transmission channels and controlling the transmission of the stored data from the storage memories to the remote station by the transmission channels by reading the accumulated seismic data stored in the storage memories and distributing the read accumulated seismic data over successive transmission windows to lessen variation in data flow during the transmission to the remote stations; and wherein the remote station reconstitutes the seismic data transmitted by the transmission channels.

14. A system as claimed in claim 13, wherein the processing unit compresses the seismic data prior to storage which decompresses the seismic data prior to transmission to the remote station.

15. A system as claimed in claim 13 wherein the processing unit compresses the seismic data to be transmitted and the remote station decompresses the received seismic data.

16. A system as claimed in claim 13, wherein the processing unit has a compression algorithm which permits selection if seismic data is to be lost during the transmission by the transmission channels.

17. A system as claimed in claim 16, wherein the processing unit comprises a signal processor programmed to apply to the seismic data a rate of data compression without loss depending on data received by the receivers.

18. A system as claimed in claims 16, wherein each storage memory comprises a first in first out memory providing ordered storage of the seismic data and a processing unit providing ordered reading of each storage memory with a rate depending on the transmission channels and the remote station.

19. A system as claimed in claim 16, wherein transmission channels are radio channels or transmission cables.

20. A system as claimed in claim 16, wherein the processing unit comprises at least one signal processor which applies at least one compression algorithm to the seismic data to be transmitted.

21. A system as claimed in claim 13, wherein the processing unit applies to the data to be transmitted at least two different compression algorithms and transfers to a corresponding storage memory compressed seismic data with one of the at least two algorithms producing a highest compression rate.

22. A system as claimed in claims 13, wherein the processing unit applies preprocessing to the seismic data prior to storage in the storage memory.

23. A system as claimed in claim 13, further comprising a displaceable mass storage subsequently positioned after storage of seismic data by the acquisition units in a vicinity of the acquisition units and a short-range linkage which connects the storage first to each storage memory which transfers to the mass storage seismic data remaining in the storage memory during at least an arbitrarily selected transmission window, so as to readout the storage and then connects the mass storage to the remote station.

* * * * *